Oct. 30, 1962    D. B. LE MAY ETAL    3,060,686
AUGMENTED GAS TURBINE ENGINE AND CONTROLS
Filed June 15, 1956    6 Sheets-Sheet 1
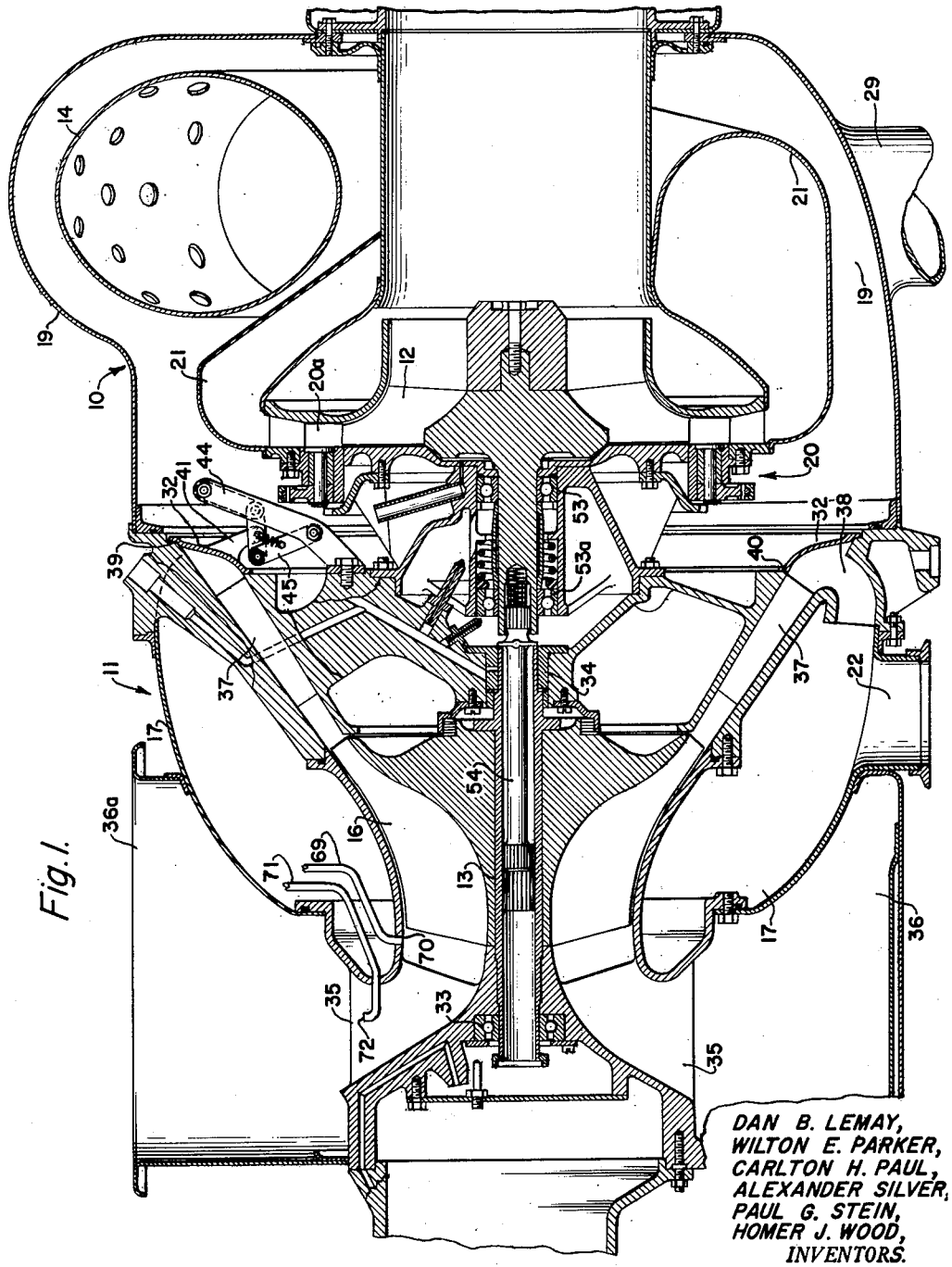
Fig. I.
DAN B. LEMAY,
WILTON E. PARKER,
CARLTON H. PAUL,
ALEXANDER SILVER,
PAUL G. STEIN,
HOMER J. WOOD,
INVENTORS.
BY John H.G. Wallace

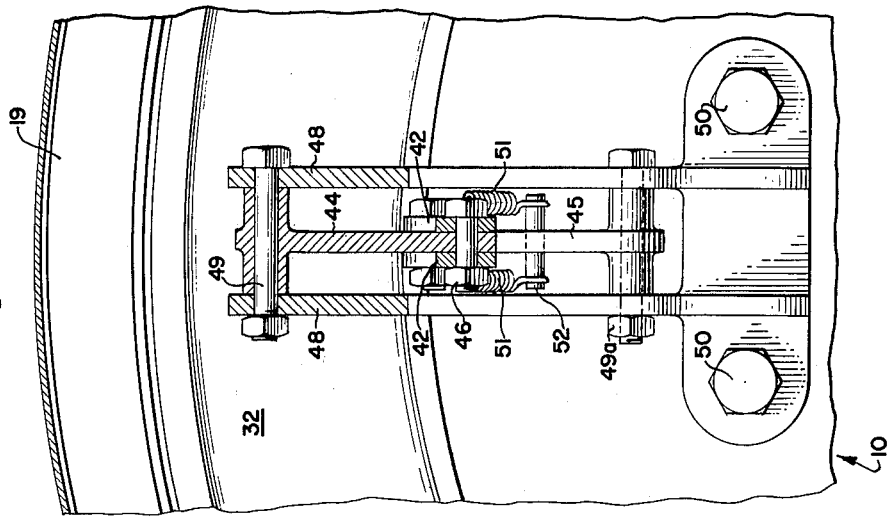
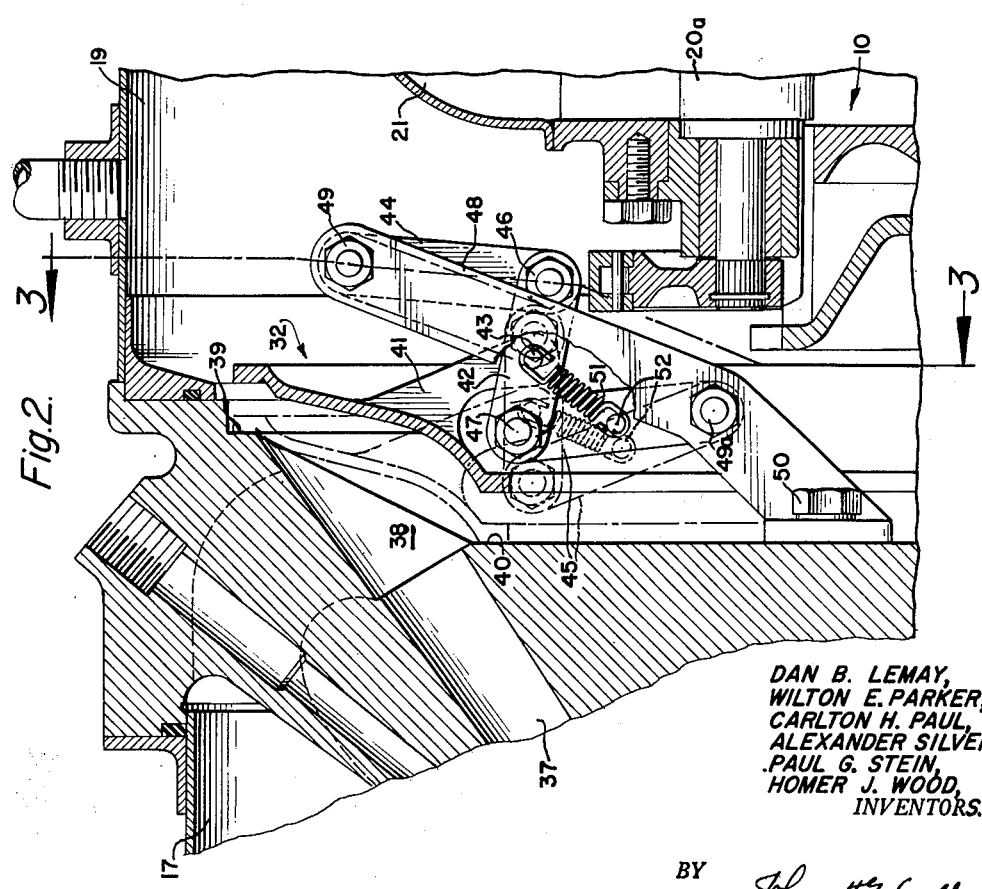

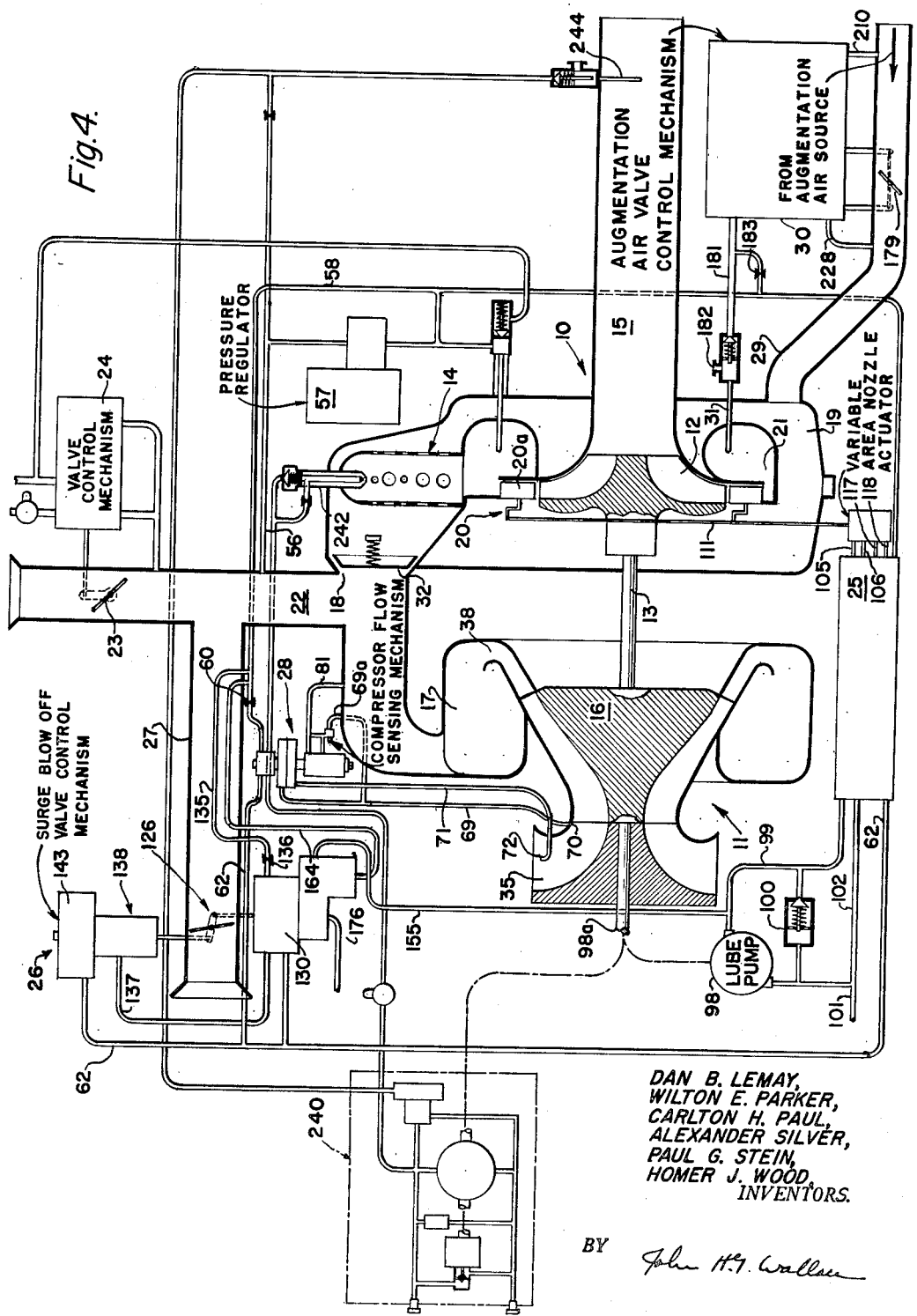

Oct. 30, 1962  D. B. LE MAY ETAL  3,060,686
AUGMENTED GAS TURBINE ENGINE AND CONTROLS
Filed June 15, 1956  6 Sheets-Sheet 4

DAN B. LEMAY,
WILTON E. PARKER,
CARLTON H. PAUL,
ALEXANDER SILVER,
PAUL G. STEIN,
HOMER J. WOOD,
INVENTORS.

BY John H. J. Wallace

Oct. 30, 1962  D. B. LE MAY ETAL  3,060,686
AUGMENTED GAS TURBINE ENGINE AND CONTROLS
Filed June 15, 1956  6 Sheets-Sheet 6

DAN B. LEMAY,
WILTON E. PARKER,
CARLTON H. PAUL,
ALEXANDER SILVER,
PAUL G. STEIN,
HOMER J. WOOD,
INVENTOR.

BY John H.G. Wallace

United States Patent Office 3,060,686
Patented Oct. 30, 1962

3,060,686
AUGMENTED GAS TURBINE ENGINE AND CONTROLS
Dan B. Le May, Palos Verdes Estates, and Wilton E. Parker, Encino, Calif., Carlton H. Paul, Scottsdale, Ariz., Alexander Silver, Tarzana, Calif., Paul G. Stein, Phoenix, Ariz., and Homer J. Wood, Sherman Oaks, Calif., assignors to The Garrett Corporation, Los Angeles, Calif., a corporation of California
Filed June 15, 1956, Ser. No. 591,591
24 Claims. (Cl. 60—39.07)

This invention relates to a gas turbine engine, and more particularly to an engine capable of furnishing auxiliary power for use in operating a variety of airborne aircraft equipment or accessories.

Operation of aircraft accessories requires auxiliary power which may be delivered in the form of pneumatic, electrical, mechanical, or hydraulic output. In some aircraft, auxiliary power is taken from the aircraft main engines. This, however, is not economical or feasible under some operating conditions or when the airplane is at rest on the ground. An aircraft, when on the ground, for example, may require refrigeration, air conditioning, electrical power, and compressed air for starting its main engines.

It is usually not economical to operate a main engine for the sole purpose of supplying motive power to accessories.

It has been recognized that an auxiliary power plant of small compact proportions, which will supply a variety of auxiliary motive power, may be a distinct tactical advantage in the over-all operation of large military aircraft, and in addition, may result in an increased payload and/or an increase in the range of an aircraft.

Previous auxiliary engines or power plants, when utilized to provide a variety of power output for operating aircraft accessories, were of necessity quite large and heavy due to the variety and aggregate of power which they were required to deliver.

Some auxiliary power plants have not been capable of operating automatically under constant speed and changing load conditions while delivering power pneumatically, mechanically and/or electrically. Furthermore, such previous machines have been unable automatically to adjust themselves to varying altitudes when delivering a variety of power under changing load conditions.

It is an object of the present invention to provide an auxiliary gas turbine engine which utilizes additional air, hereinafter called "augmentation air," from a main engine compressor to sustain operation of said auxiliary engine while it is delivering a maximum power output, whereby the auxiliary engine may be relatively small in comparison to its total useful power output.

Another object of the invention is to provide an auxiliary gas turbine for aircraft which is capable of automatically controlling its own operation under varying conditions of power output when an aircraft is on the ground, or when the aircraft is in flight at varying altitudes under conditions wherein said auxiliary engine is receiving augmentation air from the main engine of the aircraft.

Another object of the invention is to provide an auxiliary gas turbine engine having means for operating a variable area nozzle at the inlet of the turbine wheel in response to a flow condition through the compressor, whereby a flow condition through the turbine is automatically matched with that of the compressor.

Another object of the invention is to provide a gas turbine engine having a variable area nozzle at the inlet of the turbine, said nozzle being controlled by a device sensitive to flow through the compressor of the engine, whereby the turbine is matched with said compressor when operating at varying speeds, thereby maintaining optimum fuel economy and performance of the engine.

Another object of the invention is to provide a gas turbine compressor which is adapted to deliver pneumatic power and wherein a variable area nozzle at the inlet of the turbine is controlled by a device sensing flow through the compressor, whereby flow through said compressor and said turbine may be maintained at optimum conditions, and whereby said variable area nozzle is automatically opened to permit additional air to flow from the compressor through the turbine exhaust to thereby prevent a surge condition of the compressor when the demand for pneumatic power therefrom is reduced and a critical flow condition through said compressor is likely to occur.

Another object of the invention is to provide a gas turbine compressor adapted to deliver pneumatic power, and which is provided with an augmentation air inlet means communicating with the inlet of said turbine, said augmentation air inlet means being responsive to a predetermined temperature at the inlet of said turbine automatically to admit additional motive fluid to said turbine, said additional motive fluid being at a temperature below said predetermined temperature, and imparting additional power to said turbine whereby it may force said compressor to deliver an amount of power which is greater than that delivered by said engine without the assistance of said augmentation air.

Another object of the invention is to provide a gas turbine having novel means for sensing flow through its compressor in accordance with the operation thereof at varying altitudes.

Another object of the invention is to provide a gas turbine engine adapted to deliver pneumatic power and to receive augmentation air for the operation of the turbine thereof, and wherein there is a check valve disposed between the compressor and the turbine to permit air to flow from the compressor to the turbine, but to prevent augmentation air, supplied to the turbine, from flowing to the compressor outlet, whereby contamination of breathable air delivered by the compressor is prevented.

Another object of the invention is to provide a gas turbine engine having a check valve between the compressor and the turbine thereof, which permits flow from the compressor to the turbine and tends to prevent flow from the turbine to the compressor, whereby augmentation air may be supplied to the turbine at a considerably higher pressure level than that of said compressor, in order to operate said engine economically as a gas turbine motor and to permit extraction of the entire pneumatic power output from the gas turbine engine compressor for purposes other than operation of the turbine.

Another object of the invention is to provide a gas turbine compressor arranged to deliver pneumatic power and having a variable area nozzle at the inlet of the turbine and a blowoff valve at the outlet of the compressor, both of which are controlled by a device sensitive to flow through the compressor, whereby a surge condition in the compressor is avoided by the automatic opening of the variable area nozzle and the blowoff valve when said device senses the approach of a surge condition in the compressor.

A further object of the invention is to provide a gas turbine compressor which is capable of operating a great variety of aircraft accessories, including main engine starters, air conditioning systems, and electrical or hydraulic equipment, whereby desired accessories may be energized by said gas turbine compressor when the aircraft is either in static or flight conditions.

Further objects and advantages of the invention will be apparent from the following specification, appended claims and accompanying drawings, in which:

FIG. 1 is an axial sectional view of a gas turbine compressor according to the present invention and showing parts thereof fragmentarily;

FIG. 2 is an enlarged fragmentary sectional view of a check valve structure employed in the gas turbine compressor, shown in FIG. 1 of the drawing;

FIG. 3 is a fragmentary sectional view taken on the line 3—3 of FIG. 2, and showing the check valve structure fragmentarily;

FIG. 4 is a diagrammatic view of a gas turbine compressor, according to the present invention, showing various control features and accessories thereof;

Figure 5:
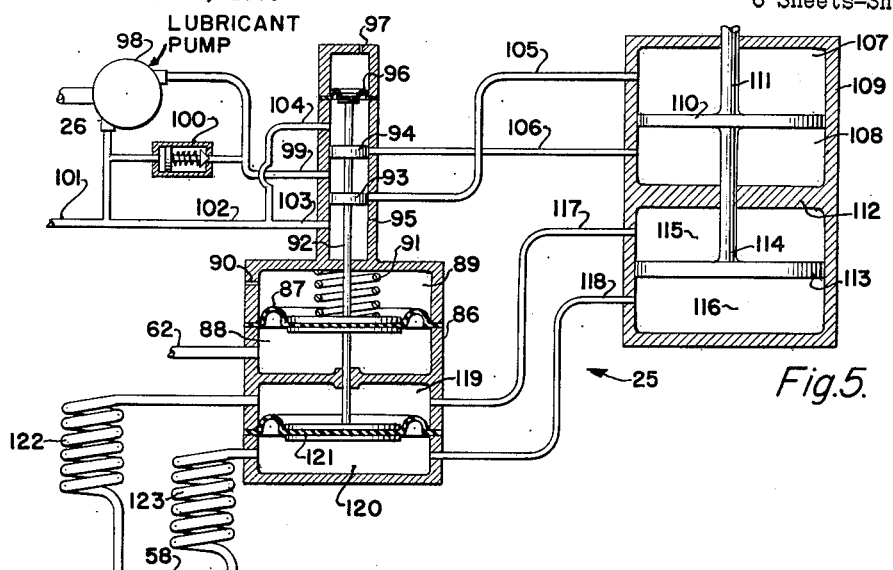
FIG. 5 is an enlarged, detailed, diagrammatic view, partly in section, of a variable area nozzle actuator, as shown in block diagram in FIG. 4 of the drawing.

As shown diagrammatically in FIG. 4 of the drawing, the apparatus in general includes a gas turbine 10, a compresosr 11 connected with the turbine for operation thereby, and various devices for controlling the operation of the apparatus and structure associated therewith. The turbine 10 has a wheel 12 connected to a shaft 13 for rotation in response to the flow of heated gases from a combustor 14 to an exhaust passage 15. Rotary motion of the turbine wheel is transmitted by the shaft 13 to an impeller 16 forming a part of the compressor 11, the movement of the impeller drawing air into the compressor inlet and discharging the air into a plenum 17 forming a part of the compressor. The plenum 17 communicates, as at 18, with a second plenum 19 forming part of the turbine, some of the air discharged from the compressor generally being employed to support combustion of fuel supplied to the combustor 14. A variable area nozzle mechanism, indicated generally at 20, is provided with adjustable vanes forming a plurality of variable area nozzles 20a between an inlet manifold 21, communicating with the combustor, and the turbine wheel 12 to control gas flow to the wheel and consequently the rate of operation of the turbine and compressor.

To conduct pneumatic power from the compressor to a point of use, the plenum 17 has a duct 22 leading therefrom, this duct containing a valve 23 to control flow from the compressor. Mechanism indicated generally by the numeral 24 is provided to control the operation of the valve 23.

In the operation of compressors of the type shown herein, there is a danger of a surge condition, which may damage the apparatus, occurring when the demand for air delivered by the compressor is suddenly reduced or completely interrupted, such as by the closure of valve 23 in duct 22.

To eliminate or prevent the occurrence of surge conditions, two devices have been provided, one being an actuating device, designated generally by the numeral 25, for the variable area nozzle mechanism 20, and the other being a surge blowoff valve mechanism, generally indicated by the numeral 26, including a duct section 27 branching from duct 22. The operations of the two surge eliminating or preventing devices 25 and 26 are under the control of a compressor flow sensing mechanism indicated by the numeral 28. The details of construction and operation of these devices and controls will be set forth hereinafter.

In some instances, during the operation of the apparatus, the demand for air from the compressor may substantially equal its entire output. In other instances, it may be necessary to have the turbine produce additional power. On such occasions, air for turbine operation may be supplied from a supplemental source, such as the main engines of an aircraft or other apparatus with which the turbine driven compressor is associated, through a duct 29 leading to the plenum 19 which houses the turbine 10.

The admission of such air, termed "augmentation air," is governed by a valve mechanism, designated generally by the numeral 30, under the primary control of a thermostatic temperature sensing device 31 which has a probe disposed in the inlet manifold of the turbine 10.

The augmentation air is precluded from flowing from the turbine plenum 19 to the compressor plenum 17 and duct 22 by a check valve 32 between the two plenums.

As shown in FIG. 1 of the drawing, the compressor 11, which is commonly known as a mixed flow compressor, due to its flow passages which extend radially and axially, has a single stage wheel 16 supported on the shaft 13, which is rotatably mounted in bearings 33 and 34. Adjacent to the inlet of the compressor 11 are guide vanes 35 which communicate with a compressor inlet plenum 36. The plenum 36 is provided with an opening 36a, which communicates with atmosphere and serves as an inlet to the plenum 36. Communicating with the outlet of the compressor 11 are diffuser vanes 37. These diffuser vanes are disposed radially and axially, and communicate with a diffuser outlet passage 38, which is substantially annular and extends in a reverse direction with respect to flow emerging from the diffuser vanes 37. The passage 38 communicates with the compressor output plenum 17, which surrounds the diffuser section of the compressor in which the vanes 37 are disposed. Communicating with the compressor output plenum 17 is the bleed duct 22 which is arranged to conduct compressed air from the compressor toward a point of use. Associated with the bleed duct 22, as shown in FIG. 4, is the load control valve 23, and the valve control mechanism, indicated generally at 24, which may be similar to that disclosed in the patent application of Alexander Silver for Load Control Valve With Inverse Rate Type Compressor Pressure Conserver, Serial No. 400,638, filed December 28, 1953, or any other suitable type.

Disposed at the output of the diffuser section and normally forming a part of a wall of the compressor outlet passage 38 is the check valve 32. This check valve 32 is annular in form and is supported for engagement with an outer annular seat 39 and an inner annular seat 40. Thus, the check valve 32 provides a closure between the compressor plenum 17 and the turbine inlet plenum 19 when the gas turbine compressor is assisted by augmentation air conducted into the latter plenum through the conduit 29 as previously indicated.

As shown in FIG. 2 of the drawings, the check valve 32 is provided with a plurality of arms 41 pivotally connected to the intermediate portions of links 42 by pins 43. The links 42 are pivoted to levers 44 and 45 by bolts 46 and 47, respectively. The levers 44 and 45 are pivoted on brackets 48 by means of bolts 49 and 49a, respectively. The brackets 48 are fixed to the frame structure of the gas turbine by means of bolts 50. Springs 51 interconnect pins 43 and 52 fixed to the links 42 and levers 45, respectively. The forces of the springs 51 tend to maintain the check valve 32 engaged with the annular seat portions 39 and 40. It will be understood that when the over-all area of the check valve 32 is subjected to a differential between output pressure of the compressor 11 and pressure in the plenum 19, the forces of the springs 51 are readily overcome, whereby the check valve is moved axially of the compressor, permitting air under output pressure from the compressor 11 to flow into the plenum 19 and around the combustor 14, which delivers gas to manifold 21 of the hot gas turbine 10.

The wheel 12 of the turbine 10 is rotatably mounted in bearings 53 and 53a and is connected in driving relation with the shaft 13, and the compressor impeller 16, by means of a quill shaft 54. The variable area nozzles 20a are disposed at the inlet of the turbine wheel 12 to control flow therethrough, in accordance with the various other functions of the gas turbine compressor, as will be hereinafter described in detail. The variable area nozzle mechanism 20, above referred to, may be similar to that disclosed in the patent application of Hans Egli, Serial No. 360,263, filed June 8, 1953, now Patent No. 2,860,-827, issued November 18, 1958, or of any suitable type.

Figure 6:
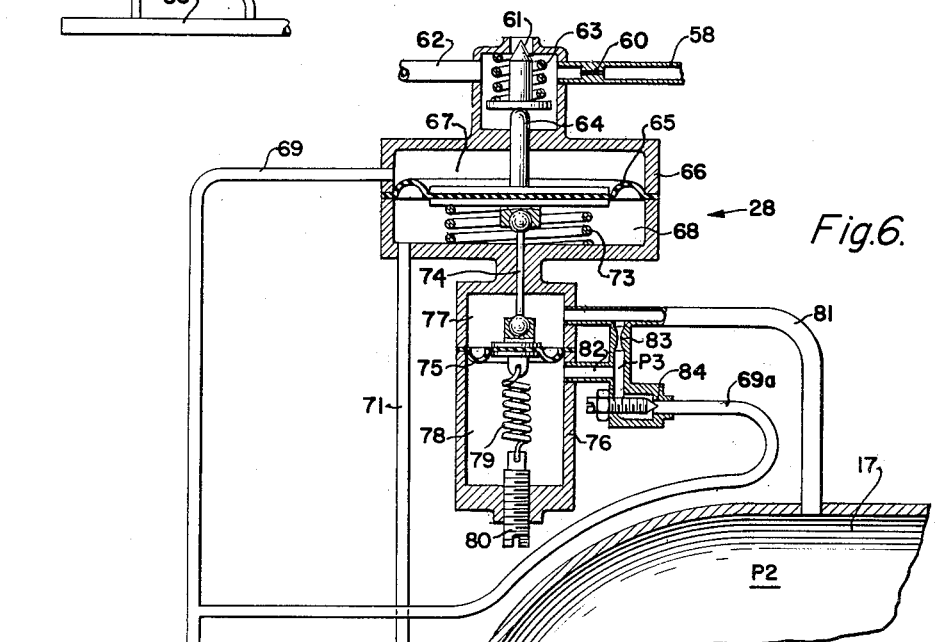
FIG. 6 is an enlarged, fragmentary, detailed, diagrammatic view, partly in section, of a compressor flow sensing device, shown in block diagram in FIG. 4 of the drawing.

As shown in FIG. 4 of the drawings, a tube 56 communicates with the bleed duct 22 and is connected to a pressure regulator 57 of any suitable type, having an output pressure conducting tube 58 which extends to the compressor flow sensing mechanism 28, shown in detail in FIG. 6. An orifice 60 is disposed in the tube 58 upstream of the compressor flow sensing mechanism to restrict the flow of air thereto. Referring to FIG. 6 of the drawings, it will be seen that the flow sensing mechanism is provided with a bleedoff valve element 61. This bleedoff valve 61 is operable in response to flow conditions through the compressor 11 for the purpose of varying control pressure in a signal pressure output tube 62.

A spring 63 tends to move the bleedoff valve 61 toward an open position which movement is controlled, through a stem 64, by a pressure responsive diaphragm 65 positioned in a casing 66. The casing 66 is provided with chambers 67 and 68 communicating with opposite sides of the diaphragm 65. A static pressure sensing tube 69 intercommunicates with the chamber 67 and the inlet of the compressor 11. One end 70 of the tube 69, which senses static pressure at the inlet of compressor 11, is located within a restricted flow area therein. A tube 71 communicating with the chamber 68 is provided with an open end 72 directed upstream of the compressor inlet, to sense total pressure therein. Thus, the diaphragm 65, during operation of the compressor 11, is subjected to a differential between total and static pressures, which reflects Mach number or velocity of flow at the compressor inlet. A spring 73, in the chamber 68, tends to force the diaphragm 65 toward the chamber 67 and toward a closing direction of the bleedoff valve 61.

Connected to the diaphragm 65 by means of a link 74 is a relatively smaller diaphragm 75, which is disposed in a casing 76, having chambers 77 and 78 communicating with opposite sides of the diaphragm 75. A spring 79 is connected to the diaphragm 75 and is adjustably supported in the casing 76 by a screw 80. The screw 80 is arranged to adjust tension of the spring 79 for calibration adjustment to balance that of the spring 73. Communicating with the chamber 77 is a tube 81 which is connected with the compressor plenum 17, whereby compressor output pressure is sensed on the side of the diaphragm 75 exposed to the chamber 77. A tube 82 extends from chamber 78 and communicates with a branch tube 69a at a point intermediate flow dividing orifices 83 and 84 disposed in series therein. The branch tube 69a is connected at one end with tube 81 and at the other with tube 69. The latter end of tube 69a may, in some instances, be left open to the atmosphere. The flow dividing orifice 83 is a fixed venturi type orifice, the effective area of which remains constant during all choked conditions of the orifice, even though the pressure at the inlet thereof may vary. The flow dividing orifice 83 communicates directly with the tube 81, which senses compressor output pressure existing in the plenum 17. The orifice 84 is adjustable for calibration purposes and communicates with the compressor inlet pressure, or ambient pressure, via tubes 69a and 69.

As shown in FIG. 6 and as used hereinafter, $P_1$ refers to pressure existing at the inlet of compressor 11; $P_2$ refers to pressure existing in the compressor outlet plenum 17; and $P_3$ refers to pressure existing between the flow dividing orifices 83 and 84 and in the chamber 78. The orifices 83 and 84 cooperating with the diaphragm 75, are arranged to reflect pressure ratio across the compressor 11. During operation of the compressor, a pressure differential is created across the diaphragm 75, causing a force thereon which corresponds to the pressure differential across the compressor 11. It will be understood that the pressure differential across the diaphragm 75 is therefore variable in proportion to the pressure differential existing across the compressor 11. This differential across the diaphragm 75 is maintained by the functioning of the orifices 83 and 84 in response to the pressure differential existing across the compressor 11.

Referring to FIG. 6 of the drawings, it will be seen that $P_2$ exists in chamber 77 and that $P_3$ exists in chamber 78, and since $P_3$ is normally lower than $P_2$, a pressure differential exists across the diaphragm which tends to force the diaphragm 75 toward the chamber 78. The pressure differential across the diaphragm 75 is changed by a change of $P_2$ in chamber 77; for example, an increase of $P_2$ tends to change the differential across the diaphragm 75, causing it to exert a force thereon toward the chamber 78. The orifice 83 is a fixed venturi type orifice, and when operating in choked condition its effective area remains constant regardless of changes in pressures at its inlet. At the same time, the sharp edged orifice 84, when subjected to a varied pressure at its inlet, experiences a change in its effective area. Thus, with each change in $P_3$ following a change in $P_2$, the effective area of the orifice 84 changes slightly, which makes a slight additional change in $P_3$. For example, when $P_3$ increases, the effective area of orifice 84 increases slightly, tending to reduce $P_3$ to a slight degree; conversely, when $P_3$ decreases, the opposite effect takes place. Therefore, operation of the orifice 84 has a tendency toward changing the pressure differential existing across the diaphragm 75, following changes in $P_2$. It will be understood that the pressure differential across the diaphragm 75 is therefore substantially proportional to the absolute value of pressure $P_2$, but is varied slightly from linear proportionality with $P_2$ by the correspondence of the effective area of the sharp edged orifice 84 with compressor pressure ratio, $P_2/P_1$. This effect provides for a non-linear function corresponding to a desired compressor performance curve which represents the most efficient functional relationship of a particular compressor with respect to compressor pressure ratio and mass flow. Normally, forces acting on the diaphragm 65 balance those acting on the diaphragm 75, whereby a modulating action of the bleedoff valve 61 provides signal control pressure in the tube 62 for controlling operation of an actuator 25, to be hereinafter described in detail, which controls the variable area nozzle mechanism 20 of the turbine. The nozzles 20a, when moved further in an opening direction by the mechanism 20, allow an increase in flow from the compressor 11; thus, the nozzles 20a have a direct effect upon Mach number or velocity of flow at the entrance to the compressor 11. Since weight flow through a compressor is directly related to the pressure ratio thereacross, when considering the efficiency of the compressor or its approach to a surge condition, the variable area nozzles 20a must automatically be adjusted according to these factors. The diaphragm 75, sensing a function of compressor outlet pressure, cooperates with the diaphragm 65, which senses compressor inlet Mach number, to provide desired flow through the compressor. For example, when a reduced flow condition through the compressor occurs, this condition is sensed by the tubes 69 and 71 communicating with chambers 67 and 68 at opposite sides of the diaphragm 65, whereupon the differential force across the diaphragm 65 is reduced. At the same time, assuming constant speed operation, a slight increase in $P2/P1$ occurs. The combination of these pressures causes diaphragms 65 and 75 to move in a direction to permit bleedoff valve 61 to open wider and cause venting of the signal control pressure tube 62. This action causes a reduced pressure signal which is transmitted to the actuator 25, causing it to further open the variable area nozzles 20a and to permit an increased flow through the compressor 11, thus avoiding a surge condition thereof. This increased flow condition through the compressor then is sensed by the tubes 69 and 71 communicating with chambers 67 and 68 at opposite sides of the diaphragm 65, whereupon the differential force across the diaphragm 65 again balances that across the diaphragm 75. It will be understood that total pressure sensed by the tube 71 is greater, relative to static pressure in the tube 69, with an increase in Mach number of flow through the compressor 11. Modulation of the valve element 61 thus establishes a control pressure output in the tube 62, which schedules a desired Mach number of flow entering the compressor, relative to $P2/P1$.

Assuming that the variable area nozzles 20a are in an over-capacity, open position, causing a mismatch of flow through the turbine 10, relative to flow through the compressor 11, the following operation may occur:

When the Mach number of flow entering the compressor is thus increased, relative to a reduced pressure ratio across the compressor, a resulting unbalance of the diaphragms 65 and 75 causes them to move the valve 61 toward a closed position, resulting in an increase of control pressure in the control pressure output tube 62. This increased control pressure causes actuator 25 to move the variable area nozzles toward a closed position, which thereby matches flow through the turbine 10, relative to flow through the compressor in a manner to restore the desired pressure ratio across the compressor 11, relative to Mach number of flow entering the compressor, and thereby effect an efficient operating condition thereof.

From the foregoing, it will be understood that the general function of the flow sensing device 28, relative to the compressor 11, is to schedule the Mach number of flow at the compressor inlet according to compressor pressure ratio. Inlet Mach number is a function of compressor inlet differential pressure (flow differential) divided by inlet total pressure. Pressure ratio is compressor outlet pressure divided by compressor inlet total pressure. Therefore, the ratio of diaphragms 65 and 75 and the area ratio of the flow dividers 83 and 84 may be varied according to a desired control function of the device 28 to match operating characteristics of various gas turbines. A further minor amount of nonlinear adjustment of the controller characteristics may be accomplished by varying the degree to which the vena contracta of the orifice 84 is suppressed by orifice shape, a sharp edged orifice being one extreme and a venturi shaped nozzle being the opposite extreme.

According to the present invention, the turbine 10 is provided with a plurality of variable area nozzles 20a which are opened in response to a reduced flow condition in the compressor when it approaches a surge condition. As hereinbefore described, the flow sensing device 28 generates a reduced pressure signal in the tube 62 when a reduced flow condition exists in the compressor 11. The signal control pressure tube 62 communicates with the variable area nozzle actuator 25, the details of which are disclosed in FIG. 5 of the drawings. The signal control pressure tube 62 communicates with the casing 86 of the variable area nozzle actuator 25 and is adapted to conduct signal control pressure to a diaphragm 87, having one side adjacent to a chamber 88 with which the tube 62 communicates. A chamber 89 at the opposite side of the diaphragm 87 is vented to atmosphere through an opening 90. Positioned in the chamber 89 is a spring 91 which tends to force the diaphragm 87 toward the chamber 88. Connected to the diaphragm 87 for movement therewith is a rod 92 having spaced spool valve portions 93 and 94 which are reciprocably mounted in a valve cylinder 95 carried by the casing 86. An extension of the rod 92 is connected to a diaphragm 96 which closes the cylinder 95 at one side of the portion 94, the opposite side of the diaphragm 96 being exposed to atmosphere through an opening 97 in the end of the cylinder 95.

A lubricant pump 98, as shown in FIG. 4, driven by the shaft 98a, furnishes oil under pressure through a tube 99 to the interior of the cylinder 95 at a location between the valve portions 93 and 94. The tube 99 communicates with a pressure relief valve 100, which regulates output pressure of the pump 98. A tube 101 communicates with the pressure relief valve 100 and the inlet of the pump 98, and also extends to an oil reservoir or sump, not shown. A fluid return tube 102 is provided with branches 103 and 104, which communicate with the valve cylinder 95 at opposite sides of the portions 93 and 94 from the point of communication of the tube 99. Communicating with the interior of the cylinder 95, adjacent to the valve portions 93 and 94, are fluid conducting tubes 105 and 106 which communicate, respectively, with chambers 107 and 108 of a hydraulic cylinder 109 in which a piston 110 is reciprocably mounted. Connected to the piston 110 is a rod 111, which is operably coupled to the variable area nozzle mechanism 20, all as shown in FIG. 4 of the drawing. Referring again to FIG. 5 of the drawing, it will be seen that the rod 111 extends beyond the piston 110 and through a partition 112 in the hydraulic cylinder 109. A second piston 113 is connected to the end 114 of the rod 111 and is reciprocably mounted in the cylinder 109. Chambers 115 and 116, at opposite sides of the piston 113, communicate through tubes 117 and 118 with chambers 119 and 120, respectively, which are located in the casing 86. A diaphragm 121 is connected to the rod 92 and is disposed between the chambers 119 and 120. Communicating with the chambers 119 and 120 are capillary tubes 122 and 123. These capillary tubes both communicate with the tube 58, which contains regulated pressure delivered by the regulator 57.

When a reduced flow condition exists in the compressor 11, and a reduced pressure signal is created in the tube 62 by the device 28, the pressure is reduced in the chamber 88. The reduction in pressure in the chamber 88 causes the spring 91 to force the diaphragm 87, rod 92, and valve portions 93 and 94 toward the chamber 88. Movement of the valve elements 93 and 94 toward the chamber 88 establishes communication between tube 106 and tube 104. Such movement also establishes communication between tube 105 and tube 99. Hydraulic pressure then passes from pump 98 through the tubes 99 and 105 to the chamber 107 and acts on the piston 110, tending to move the rod 111 in a direction to open the variable area nozzles 20a. It will be noted that when the piston 113 moves downwardly toward the end of cylinder 109, pneumatic pressure in chamber 116 is increased and is delivered to the chamber 120 where it is impressed upon the diaphragm 121, providing a feedback force thereon. This feedback force results in a slight following movement of the valve elements 93 and 94 tending gradually to shut off flow of fluid to the chamber 107 and escape of fluid from the chamber 108. Due to the restriction of the capillary tube 123, pressure in the chambers 116 and 120 is decreased gradually, all of which tends to prevent overtravel in the movement of the rod 111 during the opening of the variable area nozzles 20a to a desired position in correspondence with a degree of reduced flow through the compressor 11. Since the compressor flow sensing device 28 is a modulating apparatus, its output signal pressure in the tube 62 may cause either an increase or a decrease of pressure in the chamber 88; thus, the variable area nozzle actuating mechanism 25 may operate in the reverse direction to that as hereinbefore described. In such a reverse operation of the variable area nozzle actuating mechanism 25, the spring 91 is compressed by a differential of pressure acting on the diaphragm 87, whereupon valve portions 93 and 94 are positioned to permit the tubes 103 and 105 to communicate, whereby fluid may be exhausted from the chamber 107 to the inlet of the pump 98. At the same time, communication of the tube 99 with tube 106 is established to induct high pressure fluid into the chamber 108. Feedback pressure, as hereinbefore described, then established in the chambers 115 and 119, is gradually dissipated through the capillary tube 122.

Communicating with the compressor bleed duct 22 is the branch duct 27 of the surge blowoff valve mechanism 26. The surge blowoff valve mechanism 26 is arranged to receive a signal from the flow sensing device 28 when a reduced flow condition exists in compressor 11, whereby a valve element 126 in the duct 27 is opened to avert an impending surge condition in the compressor, in the event such a condition is not first relieved by opening of the variable area nozzles 20a by the actuating device 25 cooperating with the flow sensor 28 as hereinbefore described.

Figure 7:
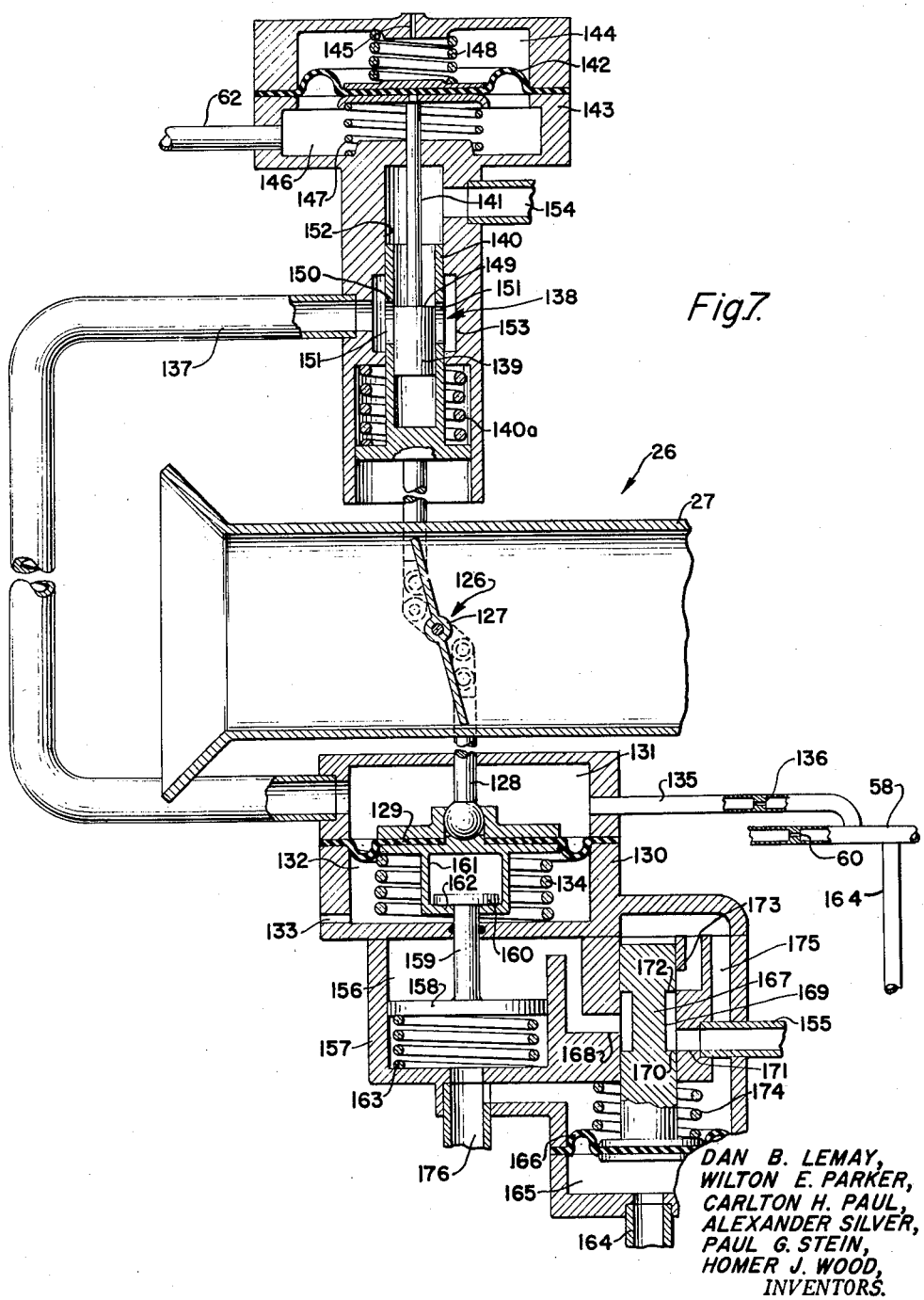
FIG. 7 is an enlarged, fragmentary, detailed, partially sectional, diagrammatic view of a compressor blowoff valve, as shown in block diagram in FIG. 4 of the drawing.

Referring to details of the surge blowoff valve 26, as shown in FIG. 7 of the drawings, it will be seen that this valve is provided with a butterfly valve element 126 which is mounted on a pivoted shaft 127 extending substantially diametrically of the branch duct 27. Connected to the shaft 127 by means of a bell crank and linkage is a rod 128, which is connected with a diaphragm 129 disposed in a valve housing 130 to form chambers 131 and 132 on opposite sides thereof. The chamber 132, by means of an opening 133, communicates with atmosphere. This chamber also contains a spring 134, which tends to force the diaphragm 129 toward the chamber 131 and tends to open the butterfly valve 126. A tube 135 communicates with the chamber 131 and with the tube 58 upstream of the orifice 60. The tube 135 is provided with an orifice 136, which is disposed between the chamber 131 and the tube 58, the latter containing regulated control pressure delivered by the pressure regulator 57. A tube 137 communicates with the chamber 131 and a feedback metering valve 138. This valve 138, being downstream from the orifice 136, is arranged to vent the chamber 131 or cause a pressure increase therein, in accordance with modulating operation of a piston valve element 139, relative to a sleeve element 140 slidably mounted in a bore portion 152 of the valve 138 and connected to the shaft 127 of valve 126 on the opposite end of the bell crank from the rod 128. A spring 140a is engaged with the sleeve 140 and tends to move it toward the valve 126. The piston valve element 139 of the valve 138 is connected by a stem 141 to a diaphragm 142 supported in a housing 143. The housing 143 is provided at one side of the diaphragm 142 with a chamber 144, which communicates with atmosphere through an opening 145. This housing is also provided at the other side of the diaphragm 142 with a chamber 146, which communicates with the tube 62. The tube 62 conveys signal control pressure provided by the flow sensing device 28 to the chamber 146. Thus, the diaphragm 142 is sensitive to signal control pressure, which acts to position the piston valve element 139 relative to the sleeve element 140.

Positioned in the chamber 146 is a spring 147, which is opposed by a relatively stronger spring 148 located in the chamber 144 and acting against the diaphragm 142. The spring 148 tends to overcome the spring 147 and force the feedback valve element 139 toward the duct 27 when a reduced pressure signal is conducted by the tube 62 and sensed by the diaphragm 142 in the chamber 146. A shoulder 149 at one end of the feedback valve element 139 is disposed to meter flow at edges 150 of ports 151 in the feedback valve sleeve element 140. The bore portion 152 in which the sleeve element 140 is mounted is provided with an enlarged portion 153 which surrounds the ports 151 to provide for flow from the tube 137 into the ports 151. The shoulder 149 of the piston valve element 139, when spaced from the ends 150 of the ports 151, permits bleedoff flow to pass to atmosphere through a tube 154. It will be understood that a reduced pressure signal generated by the flow sensing device 28, when applied to the diaphragm 142, causes the valve element 139 to move relative to the sleeve element 140 to open ports 151. Thus, bleedoff flow from chamber 131 will be exhausted through the tube 154 causing a decrease of pressure in the chamber 131. When pressure is decreased in the chamber 131, the spring 134 forces the diaphragm 129 toward the duct 27, whereby the rod 128 and its connected linkage will move the butterfly valve 126 toward an open position. Thus, a reduced pressure signal generated by the flow sensing device 28 causes the valve 126 to open and prevent a surge condition in the compressor 11 by permitting an increased flow therethrough. It will be noted that the variable area nozzle actuator 25 is responsive to a signal magnitude which is nominal compared to that which causes operation of the surge relief valve 126. Thus, the surge relief valve 126 responds with a slight delay as compared to response of the variable area nozzle actuator 25. In this manner, the surge relief valve 126 opens after the variable area nozzles 20a have first opened to avert a surge condition in the compressor 11. In the event signal magnitude is nominal, the surge relief valve 126 may not open following surge relief operation of the variable area nozzle actuator 25. In addition, it will be understood that the variable area nozzle actuator 25, having high pressure hydraulic fluid delivered by the pump 98, is capable of opening the variable area nozzles 20a more rapidly than opening operation of the valve 126 by attendant pneumatic forces which are of considerably lower p.s.i.

When the gas turbine compressor is not operating, reduced pressure in the chamber 131 permits the spring 134 to maintain the butterfly valve 126 in open position. During starting operations of the gas turbine compressor, the valve 126 must be closed in order to permit the compressor 11 to build up sufficient pressure to support combustion in the combustor 14 and to accelerate the turbine 10. The valve 126 is held closed by hydraulic pressure from the gas turbine lubrication pump 98 until compressor output pressure reaches a predetermined value, whereby output flow from the compressor will not be bled off until said compressor output pressure is of sufficient magnitude to cause the turbine to reach approximately 75% of its operating speed, as will be hereinafter described.

As shown in FIGS. 4 and 7 of the drawings, a tube 155, communicating with the outlet of the pump 98, conducts hydraulic fluid under pressure to a chamber 156 in a housing 157, which is connected to the housing 130. Since the pump 98 is a positive displacement pump arranged to provide lubricating oil under high pressure to various parts of the gas turbine during starting and acceleration of the gas turbine, the output pressure of this pump builds up more rapidly than does output pressure from compressor 11. Thus, during starting of the gas turbine, the oil pump 98 delivers high pressure fluid to the chamber 156 where it is applied to a piston 158. A stem 159 of the piston 158 is connected to the diaphragm 129 so that movement of the piston in response to hydraulic pressure in the chamber 156 is transmitted to the diaphragm 129 causing a closing action of the valve 126. The stem 159 is provided with an enlarged head 160 for reception in a cup-shaped element 161 carried by the diaphragm to form an overtravel connection therewith. The head 160 bears against one end 162 of the cup-shaped element 161 and the stem 159 extends therethrough and into the chamber 156. A spring 163 engages the piston 158 and tends to force it toward the diaphragm 129, whereby the head 160 on the stem 159 may be disengaged from the end 162 of the cup 161 when hydraulic pressure is relieved from the chamber 156, as will be hereinafter described.

As shown in FIGS. 4 and 7, a tube 164 communicates directly with the tube 58 and contains regulated control pressure delivered by the pressure regulator 57. This tube 164 communicates with a chamber 165 in the housing 157, one side of the chamber 165 being formed by a diaphragm 166 having a by-pass valve element 167 connected thereto. The by-pass valve element 167 is arranged to control flow of hydraulic fluid from the tube 155 to a passage 168, which communicates with the chamber 156. The valve element 167 is provided with a groove 169, having a shoulder 170 at one end adjacent to a port 171 with which the tube 155 communicates. The opposite end of the groove 169 forms a second shoulder 172, which is arranged to uncover a by-pass port 173 and permit hydraulic fluid to flow from the chamber 156 through the passage 168 and groove 169 to the by-pass port 173 when output pressure of the compressor 11 reaches a predetermined value during starting of the gas turbine compressor. When the compressor output pressure in the chamber 165 overcomes opposing pressure of a spring 174, the edge 172 of the groove 169 uncovers the by-pass port 173, permitting flow through a passage 175, which communicates with an oil return tube 176, extending to a sump, not shown, which communicates with the pump 98. The spring 174 maintains a position of the valve element 167, which permits communication of the tube 155 with the chamber 156, whereby oil pressure may be exerted against the piston 158 until compressor output pressure in the chamber 165 is sufficient to overcome the compressive force of the spring 174. The valve element 167 is then forced to by-pass hydraulic fluid from the chamber 156 to the oil return line 176, whereupon operation of the valve 126 is subsequently controlled pneumatically and by springs, as hereinbefore described.

As shown in FIG. 1 of the drawing, the plenum 19 surrounds the check valve 32 at the outlet of the compressor diffuser section and also extends axially of the gas turbine compressor in surrounding relationship with the turbine inlet manifold 21. The plenum 19 also surrounds the combustor 14, which communicates with the turbine inlet manifold 21 for delivering combustion gas to the turbine 10.

Figure 8:
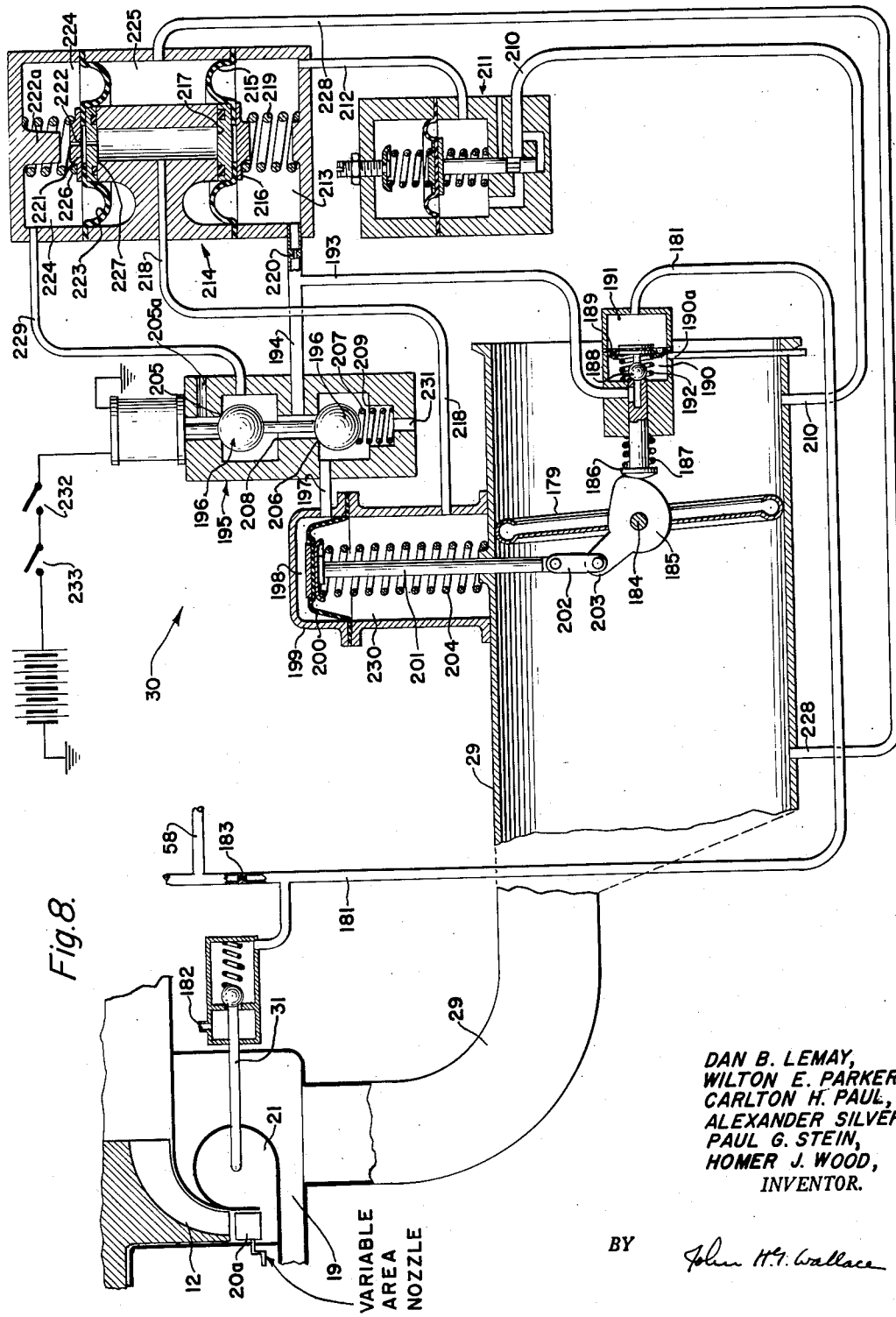
FIG. 8 is an enlarged, detailed, diagrammatic view of augmentation valve mechanism, as shown in block diagram in FIG. 4 of the drawing.

As shown diagrammatically in FIG. 8, the plenum 19 communicates with the augmentation air inlet duct 29 in which the element 179 of augmentation valve mechanism 30 is disposed to control the flow of compressed air through the duct into the plenum 19 to support combustion in the combustor 14 and thereby supply products of combustion to the inlet manifold 21 of the turbine 10. The valve mechanism 30 includes structure which will cause element 179 to close automatically when pressure upstream thereof falls to a predetermined minimum. Other structure in the mechanism 30 causes it to serve as a pressure regulating valve which tends to maintain a substantially constant pressure downstream of element 179 in order to provide the turbine 10 with a source of pressure regulated motive fluid. The mechanism 30 is also provided with a solenoid valve 195, which responds to an overspeed condition of the gas turbine compressor and causes the valve element 179 to close and shut off the supply of motive fluid being delivered to the turbine 10 to thereby avert an overspeed condition. Specific construction and operation of the valve mechanism 30 is hereinafter described.

The thermostat 31 is disposed to sense temperature of gases in the inlet plenum 21 of the turbine 10. This thermostat 31 is operable to initiate opening movement of the valve element 179 when a pneumatic bleed load on the compressor 11 is such that added fuel delivered to the combustor 14, tending to match the load, causes an increased temperature at the inlet of the turbine 10. When the turbine inlet temperature rises to a predetermined degree, the thermostat 31 transmits via tube 181 a pneumatic pressure signal to the valve mechanism 30 to effect opening movement of element 179 to admit augmentation air. The thermostat 31 is normally an open thermostatic valve which permits a slight amount of air to be bled therethrough to atmosphere via a vent 182. The tube 181 communicates with the control pressure tube 58 through an orifice 183. When temperature in the turbine inlet manifold 21 rises to a predetermined degree, the thermostatic valve 31 tends to close and reduce bleed flow therethrough. Consequently, pressure in the tube 181 increases and initiates the operation of the valve mechanism 30 in a manner hereinafter described.

As shown in FIG. 8 of the drawings, the valve element 179 of mechanism 30 is pivotally mounted in the duct 29 by means of a shaft 184. Connected to this shaft for movement with element 179 is a cam 185 engaged by a cam following valve element 186. A spring 187 holds the valve element 186 in following engagement with the cam 185. A cooperative pilot valve element 188 is operably connected with a diaphragm 189, communicating on one side with a chamber 190, which is vented to atmosphere through a passage 190a, and with a chamber 191 on its opposite side, which is subjected to the pressure in tube 181. A spring 192 exerts force on the diaphragm 189, tending to oppose the pressure in chamber 191. The pilot valve element 188 is provided with a spherical end which seats in a hollow cylindrical end of the cam following valve element 186. Communicating with the cam following valve element 186 is a tube 193, which is provided with a branch portion 194 communicating with the solenoid valve 195. This solenoid valve is provided with a double ball valve element 196, which is adapted to control flow from the tube branch 194 to a tube 197 which communicates with a chamber 198 at one side of a diaphragm 200 disposed in a housing 199 to form a chamber 230 on the opposite side thereof. The diaphragm 200 is connected by a rod 201 with a toggle link 202, which in turn is pivotally connected to an arm 203 extending from the cam 185. A spring 204 tends to force the diaphragm 200 in a direction to oppose control pressure in the chamber 198 and closes the valve element 179. Pressure supplied to chamber 198 will move diaphragm 200 in opposition to spring 204 and because rod 201 to rock element 179 toward an open position. Fluid pressure for operating diaphragm 200 is taken from the augmentation air source in the manner hereinafter described.

Primarily, the solenoid valve 195 is employed as a pilot valve, whereby initiation of the operation of the augmentation valve mechanism 30 may be manually controlled. This feature is necessary since there may be conditions of operation under which main engine bleed air, for example, is not available or needed for augmenting the operation of the gas turbine compressor. The solenoid valve 195 is shown in FIG. 8 in the de-energized condition wherein the ball elements 196 thereof contact seats 205 and 206 under the influence of a spring 207. The ball elements in this position prevent control pressure in the tube 194 from communicating with the tube 197 and chamber 198, and consequently prevent opening movement of the valve element 179 by the diaphragm 200. When the solenoid valve 195 is energized, it causes the ball elements 196 to be disengaged from seats 205 and 206 and engaged with seat portions 208 and 209, whereupon communication between tubes 194 and 197 is established.

Fluid pressure for the tubes 193 and 194 is supplied from a tube 210 which communicates with the duct 29 upstream of the valve 179 relative to the source of augmentation air. This tube 210 communicates with a conventional pressure regulator 211, which reduces pressure to an output tube 212. This reduction of control pressure is necessary, since main engine bleed air may be at a higher pressure than that in the plenum 19 communicating with the output of compressor 11. The output pressure of the pressure regulator 211 is conducted by the tube 212 to a chamber 213 in a check valve 214. The chamber 213 communicates through an orifice 220 with the tube 193 and its branch 194. The orifice 220 has a flow capacity which is less than that of the cam following valve element 186 and the pilot valve element 188, whereby modulating operation of the pilot valve element 188 is capable of regulating pressure in the tube 193, branch 194, and chamber 198.

The check valve 214 is provided with a diaphragm 215 which communicates with the chamber 213 and carries a check valve element 216, which engages the check valve seat 217 communicating with a tube 218. A light spring 219 tends to maintain the check valve 216 seated. The tube 218 communicates with the chamber 230 of the housing 199 and conducts pressure to the diaphragm 200 in opposition to that conducted into the chamber 198 via tube 197.

The check valve 214 is also provided with a second check valve element 221, having an orifice 222 therein. A diaphragm 223 is connected to the check valve element 221 and is subjected to pressure in a chamber 224 on its one side and to pressure in a chamber 225 on its opposite side. A spring 226 tends to hold the check valve 221 on a seat 227, while pressure in the chamber 225 tends to unseat the check valve 221 and permit pressure in the chamber 225 to communicate with the tube 218. When the check valve 221 is seated on the seat 227, fluid may leak through the orifice 222. When, however, the pressure acting on the diaphragm 223 is sufficient to move the check valve 221 against a projection 222a, the orifice 222 is closed and leakage of pressure through the orifice is prevented. Pressure in the chamber 225 is supplied through a tube 228, communicating with the duct 29 at a location between the valve 179 and the gas turbine plenum 19.

A tube 229 intercommunicates with the chamber 224 and the seat 208 of the solenoid valve 195 when it is deenergized, and provides a means whereby pressure may be conducted from the tube 194 through the tube 229, the chamber 224, orifice 222, and tube 218, into the chamber 230 communicating with the diaphragm 200. While pressure is thus being increased in the chamber 230, pressure in the chamber 198 is concurrently bled to atmosphere through tube 197, seat 209, and a vent 231, to permit the spring 204 to quickly close the valve 179. The rapid closing operation of the valve 179 may be responsive to an overspeed condition of the gas turbine compressor which automatically causes de-energization of the solenoid valve 195. Such de-energization of the solenoid valve 195 may be accomplished by means of an overspeed switch 232 in series with a manual control switch 233, all as shown in FIG. 8 of the drawing. A conventional centrifugally responsive means (not shown) driven by the turbine is disposed to operate the switch 232.

During normal operation of the augmentation valve, as shown in FIG. 8 of the drawing, the thermostat 31 controls modulation of the flow of augmentation air through the duct 29, in accordance with the temperature of the gases at the inlet of turbine 10. When the turbine approaches an overload condition, the thermostat 31 senses a predetermined maximum temperature and automatically reduces bleed flow from the tube 181 to the atmospheric vent 182. Such a reduction in bleed flow causes pressure downstream of the orifice 183 to increase, whereupon the diaphragm 189 tends to close the pilot valve 188 relative to the cam following valve element 186, whereby pressure in the tube 193 downstream of the orifice 220 increases. Assuming that the solenoid valve 195 is energized, the ball elements 196 seat on the seat portions 208 and 209, and the branch tube 194 communicates with the tube 197 and the chamber 198, whereby the pressure differential across the diaphragm 200 is changed. This tends to move the diaphragm 200 toward the chamber 230 and to rotate the valve 179 toward an open position, during which time the cam following valve element 186 follows the cam 185 to provide feedback action, which precisely positions the valve 179 according to the magnitude of pressure in the chamber 191. When the ball elements 196 are seated on the seats 208 and 209, the seat 205 intercommunicates with the tube 229 and a passage 205a, communicating with atmosphere and acting as a vent for chamber 230 via tube 218 and the orifice 222.

A conventional fuel control system comprising a fuel bypass control 240, fuel nozzle 242, and a tailpipe thermostat 244 is shown in FIG. 4. This fuel system is no part of the present invention.

It will be understood that normal operation of thermostat 31 provides for modulating control of the valve 179, whereby operation of the gas turbine compressor is augmented when a large demand for pneumatic flow from the compressor 11 exists.

The valve 179 is arranged to function as a pressure regulating valve in order to prevent undesirably high pressure from existing in the duct 29 and at the inlet of the turbine 10. The tube 228, communicating with the duct 29 between the valve 179 and the gas turbine plenum 19, acts as a pressure pickup downstream of the valve 179. The output pressure of the pressure regulator 211 is set to substantially correspond with a desired maximum pressure in the duct 29. Thus, pressure in the chamber 213, and therefore the desirable maximum pressure obtainable in the chamber 198, is substantially equal to a maximum pressure obtainable in the duct 29. It will be understood that when pressure downstream of the valve 179 tends to increase beyond the desired maximum, due to augmentation flow therethrough, such pressure is conducted by the tube 228 to the chamber 225. Pressure in this chamber 225 is then greater than regulated pressure in the chamber 213, whereupon the check valve 216 is opened against the light spring 219 by the diaphragm 215 to permit flow into the tube 218. At this time the solenoid valve 195 is assumed to be closed upon its seat 208 and open at its seat 206. Thus, pressure in the chamber 225, while it opens the check valve 216, may concurrently open the check valve 221, which also communicates with the tube 218. When the check valve 221 is thus opened, the orifice 222 is closed against the projection 222a. The tube 218, communicating with the chamber 230, conducts increased pressure thereto, which changes the pressure differential across the diaphragm 200, assisting the spring 204 to force the valve 179 toward the closed position. The valve 179 is thus moved toward a closed position to restrict flow therethrough and to thereby reduce pressure in the duct 29 downstream of the valve 179.

It will be noted that when the valve 179 is moved toward a closed position, the cam 185 concurrently tends to close the cam following valve element 186 relative to the pilot valve element 188, whereupon pressure is fed back to the chamber 198 through the tubes 197, 194 and 193. Thus, the valve 179 is prevented from overshooting during a movement toward closed position thereof.

It will be understood that the check valve 216 also functions to sense a differential between pressures in the chambers 213 and 225 when the pressure of air delivered from the main engine is reduced below that at the output of the compressor 11. Such a condition may arise as a result of partial disability or failure of the main engine delivering augmentation air to the duct 29. Under such a condition, the output pressure of the main engine would be lower than the output pressure of the regulator 211, whereby pressure in the chamber 213 may be lower than the output pressure of the compressor 11 which is conducted to chamber 225 by the tube 228. Thus, a pressure differential may be created across the diaphragm 215, which will cause opening of the check valve 216 against compression of the spring 219 to permit flow of pressure into the tube 218 and chamber 230. A pressure differential will then exist across the diaphragm 200, causing it to move toward the chamber 198 assisted by the force of the spring 204. Under the foregoing conditions, air being bled from the main engine is automatically interrupted by the valve 179 when flight conditions of the airplane, or failure of the engine make the extraction of augmentation air from the main engine for use by the gas turbine compressor inadvisable.

It is desired to emphasize the fact that various modifications of the present invention may be resorted to in a manner limited only by a just interpretation of the following claims.

We claim:

1. In a gas turbine engine, the combination of: a compressor; a turbine arranged to drive said compressor; a combustor disposed to receive air from said compressor and to deliver gas to the inlet of said turbine; a first conduit for delivering air to said combustor upstream of said turbine in addition to air delivered thereto by said compressor; a second conduit disposed for extracting pneumatic power from said compressor; and a check valve disposed between said compressor and said combustor to permit flow from said compressor to said turbine and to prevent flow from said first conduit into said second conduit.

2. In a gas turbine engine, the combination of: a compressor; a turbine arranged to drive said compressor; a combustor disposed to receive air from said compressor and to deliver gas to the inlet of said turbine; a first conduit for delivering air to said combustor upstream of said turbine in addition to air delivered thereto by said compressor; a second conduit for extracting pneumatic power from said compressor; a check valve disposed to permit flow from said compressor to said turbine and to prevent flow from said first conduit into said second conduit, said check valve being disposed between said compressor and said combustor whereby said turbine may be operated by fluid from said first conduit while the output of said compressor is extracted from said second conduit; and resilient means tending to hold said check valve closed against flow from said compressor toward said turbine.

3. In a gas turbine engine, the combination of: a compressor; a turbine arranged to drive said compressor; a combustor disposed to receive air from said compressor and to deliver gas to the inlet of said turbine; a first conduit for delivering air to said combustor upstream of said turbine in addition to air delivered thereto by said compressor; a second conduit disposed for extracting pneumatic power from said compressor; an annular diffuser assembly communicating with the outlet of said compressor; and an annular check valve communicating with the outlet of said diffuser and disposed to permit flow from said compressor to said turbine and to prevent flow from said first conduit into said second conduit.

4. In a gas turbine engine, the combination of: a compressor; a turbine arranged to drive said compressor; a combustor disposed to receive air from said compressor and to deliver gas to the inlet of said turbine; a first conduit for delivering air to said combustor upstream of said turbine in addition to air delivered thereto by said compressor; a second conduit disposed for extracting pneumatic power from said compressor; an annular diffuser assembly communicating with the outlet of said compressor; an annular check valve communicating with the outlet of said diffuser and disposed to permit flow from said compressor to said turbine and to prevent flow from said first conduit into said second conduit; a pneumatic bleed passage means between said diffuser and said check valve; and a duct for receiving flow from said bleed passage, said duct surrounding said diffuser assembly, and communicating with said second conduit.

5. In a gas turbine engine, the combination of: a compressor; a turbine arranged to drive said compressor; a combustor disposed to receive air from said compressor and to deliver gas to the inlet of said turbine; a first conduit for delivering air to said combustor upstream of said turbine in addition to air delivered thereto by said compressor; a second conduit disposed for extracting pneumatic power from said compressor; an annular check valve disposed to permit flow from said compressor to said turbine and to prevent flow from said first conduit into said second conduit, said check valve having stationary mounting means and linkage pivoted on said mounting means for supporting said check valve and permitting axial opening and closing movement relative to said compressor.

6. In a gas turbine engine, the combination of: a turbine; a combustor communicating with the inlet of said turbine; a compressor driven by said turbine and arranged to deliver air to said combustor; a variable area nozzle disposed to control flow through said turbine; first means disposed to actuate said variable area nozzle; second means disposed to sense the quantity of fluid flowing through said compressor and to control said first means, said second means being responsive to a predetermined reduced flow through said compressor and generating a signal which causes said first means to actuate said variable area nozzle toward an open position; a bleed flow duct communicating with said compressor whereby pneumatic power may be extracted therefrom; a blowoff valve communicating with said bleed duct; and actuating means for said blowoff valve communicating with said second means, whereby a signal generated by said second means causes said blowoff valve to open, said variable area nozzle and said blowoff valve when moved toward open positions relieving a reduced flow condition through said compressor to prevent surge thereof.

7. In a gas turbine engine, the combination of: a turbine; a compressor driven thereby; conduit means for extracting pneumatic power from said compressor; a compressor surge blowoff valve communicating with said conduit means; a pneumatic actuator for said blowoff valve, said actuator communicating with a source of control pressure provided by said compressor; signal generating means responsive to the quantity of fluid flowing through said compressor and operatively connected to said pneumatic actuator; a hydraulic pump driven by said engine; means on said actuator communicating with said hydraulic pump for holding said blowoff valve closed during starting of said gas turbine compressor whereby acceleration of said compressor causes output pressure thereof to build up; and means responsive to said compressor output pressure and operative in connection with said last-mentioned means for relieving hydraulic pressure therefrom after said gas turbine compressor is started and has delivered substantial compressor output pressure.

8. In a gas turbine engine, the combination of: a turbine; a compressor driven thereby; conduit means for extracting pneumatic power from said compressor; a compressor surge blowoff valve having a duct portion communicating with said conduit means, said duct portion having a main valve element therein; a pneumatic actuator for the main valve element of said blowoff valve, said actuator communicating with a source of control pressure provided by said compressor; signal generating means responsive to the quantity of fluid flowing through said compressor and operatively connected to said pneumatic actuator and having a pilot valve comprising a pair of cooperable valve elements, one of which is responsive to said control pressure and the other of which is actuated by said main valve element; a hydraulic pump driven by said gas turbine; means on said actuator communicating with said hydraulic pump for holding said blowoff valve closed during starting of said gas turbine compressor whereby acceleration of said compressor causes output pressure thereof to build up; and means responsive to said compressor output pressure and operative in connection with said last-mentioned means for relieving hydraulic pressure therefrom after said gas turbine compressor is started and has delivered substantial compressor output pressure.

9. In a gas turbine engine, the combination of: a turbine; a combustor communicating with the inlet of said turbine; a compressor driven by said turbine and arranged to deliver air to said combustor; a variable area nozzle disposed to control flow through said turbine; first means disposed to actuate said variable area nozzle; second means disposed to sense the quantity of fluid flowing through said compressor and to control said first means, said second means being responsive to a predetermined reduced flow through said compressor and generating a signal which causes said first means to actuate said variable area nozzle toward an open position; a bleed flow duct communicating with said compressor whereby pneumatic power may be extracted therefrom; a blowoff valve communicating with said bleed duct; actuating means for said blowoff valve communicating with said second means; a pneumatically responsive pilot valve for said blowoff valve actuating means operable by said signal from said second means to cause said blowoff valve to open, said variable area nozzle and said blowoff valve when moved toward open positions relieving a reduced flow condition through said compressor to prevent surge thereof; and pump means driven by said gas turbine engine for delivering operating fluid under pressure to said first means.

10. In a gas turbine engine, the combination of: a turbine; a combustor communicating with the inlet of said turbine; a compressor driven by said turbine and arranged to deliver air to said combustor; a variable area nozzle disposed to control flow through said turbine; first means disposed to actuate said variable area nozzle; second means disposed to sense the quantity of fluid flowing through said compressor and to control said first means, said second means being responsive to a predetermined reduced flow through said compressor and generating a signal which causes said first means to actuate said variable area nozzle toward an open position; a pressure regulator communicating with said compressor and arranged to deliver pneumatic control pressure to said second means; a bleed flow duct communicating with said compressor whereby pneumatic power may be extracted therefrom; a blowoff valve communicating with said bleed duct; actuating means for said blowoff valve communicating with said second means; and a pneumatically operable pilot valve for said blowoff valve actuating means operable by said signal from said second means to cause said blowoff valve to open, said variable area nozzle and said blowoff valve when moved toward open position relieving a reduced flow condition through said compressor to prevent surge thereof.

11. In a gas turbine engine, the combination of: a turbine; a combustor communicating with the inlet of said turbine; a compressor driven by said turbine and arranged to deliver air to said combustor; a variable area nozzle disposed to control flow through said turbine; first means disposed to actuate said variable area nozzle; second means disposed to sense the quantity of fluid flowing through said compressor and to control said first means, said second means being responsive to a predetermined reduced flow through said compressor and generating a signal which causes said first means to actuate said variable area nozzle toward an open position; a bleed flow duct communicating with said compressor whereby pneumatic power may be extracted therefrom; a blowoff valve communicating with said bleed duct; actuating means for said blowoff valve communicating with said second means whereby a signal generated by said second means causes said blowoff valve to open, said variable area nozzle and said blowoff valve when moved toward open position relieving a reduced flow condition through said compressor to prevent surge thereof; a check valve disposed to permit flow from said compressor to said turbine and arranged to prevent flow from said turbine to said compressor; and conduit means communicating with the inlet of said turbine to furnish additional motive fluid thereto whereby the pneumatic power output of said compressor may be increased when large bleed flow demands are made thereupon.

12. In a gas turbine engine, the combination of: a turbine; a combustor communicating with the inlet of said turbine; a compressor driven by said turbine and arranged to deliver air to said combustor; a variable area nozzle disposed to control flow through said turbine; first means disposed to actuate said variable area nozzle; second means disposed to sense the quantity of fluid flowing through said compressor and to control said first means, said second means being responsive to a predetermined reduced flow through said compressor and generating a signal which causes said first means to actuate said variable area nozzle toward an open position; a bleed flow duct communicating with said compressor whereby pneumatic power may be extracted therefrom; a blowoff valve communicating with said bleed duct; actuating means for said blowoff valve communicating with said second means whereby a signal generated by said second means causes said blowoff valve to open, said variable area nozzle and said blowoff valve when moved toward open positions relieving a reduced flow condition through said compressor to prevent surge thereof; a check valve disposed to permit flow from said compressor to said turbine and arranged to prevent flow from said turbine to said compressor; conduit means communicating with the inlet of said turbine to furnish additional motive fluid thereto whereby the pneumatic power output of said compressor may be increased when large bleed flow demands are made thereupon; a control valve in said conduit means; and a thermostat disposed to sense outlet temperature of said turbine and communicating with said control valve, said thermostat being arranged to provide a signal to said control valve when said thermostat senses a temperature change at the outlet of said turbine whereby said control valve responds to said signal and modulates augmentation flow through said conduit to said turbine.

13. In a gas turbine engine, the combination of: a compressor; a turbine for driving said compressor; a combustor disposed to receive air from said compressor and to deliver gas to the inlet of said turbine; a conduit communicating with said combustor upstream of said turbine for delivering compressed air thereto in addition to that delivered by said compressor; a valve disposed to control flow through said conduit; and a thermostat disposed to sense temperature of fluid flowing through said turbine, said thermostat being disposed to control said valve to modulate flow through said conduit to said combustor in accordance with said temperature.

14. In a gas turbine engine, the combination of: a compressor; a turbine for driving said compressor; a combustor disposed to receive air from said compressor and to deliver gas to the inlet of said turbine; a conduit communicating with said combustor upstream of said turbine for delivering compressed air thereto in addition to that delivered by said compressor; a valve in said conduit; a thermostat disposed to sense temperature of fluid flowing through said turbine, said thermostat being disposed to control said valve to modulate flow through said conduit to said combustor in accordance with said temperature; a check valve disposed between said compressor and said combustor; and a bleed duct communicating with the outlet of said compressor and disposed upstream of said check valve, said bleed duct serving as a means to extract pneumatic power from said compressor.

15. In a gas turbine engine, the combination of: a compressor; a turbine arranged for driving said compressor; plenum means for conducting air from said compressor to said turbine; a check valve arranged automatically to prevent flow through said plenum means from said turbine toward said compressor; a variable area nozzle disposed to control flow through said turbine; first means for actuating said variable area nozzle; second means disposed to sense the quantity of fluid flowing through said compressor and to control said first means, said second means being responsive to a change of flow through said compressor to generate a signal which causes said first means to actuate said variable area nozzle to thereby match the operating characteristics of said turbine with those of said compressor; a conduit means communicating with the inlet of said turbine and arranged to deliver augmentation air thereto; and an augmentation air control valve arranged to control flow through said conduit means to said turbine.

16. In a gas turbine engine, the combination of: a compressor; a turbine for driving said compressor; a combustor disposed to receive air from said compressor and to deliver gas to the inlet of said turbine; a conduit communicating with said combustor upstream of said turbine for delivering compressed air thereto in addition to that delivered by said compressor; a valve in said conduit; a thermostat disposed to sense temperature of fluid flowing through said turbine, said thermostat being disposed to control said valve to modulate flow through said conduit to said combustor in accordance with said temperature; a check valve disposed between said compressor and said combustor; and a bleed duct communicating with the outlet of said compressor and disposed upstream of said check valve, said bleed duct serving as a means to extract pneumatic power from said compressor, said check valve being disposed to prevent flow from said conduit into said bleed duct, whereby contamination of fluid in said bleed duct is minimized.

17. In a gas turbine engine, the combination of: a compressor; a turbine for driving said compressor; a combustor disposed to receive air from said compressor and to deliver gas to the inlet of said turbine; a conduit communicating with said combustor upstream of said turbine for delivering compressed air thereto in addition to that delivered by said compressor; a main valve disposed to control flow through said conduit; a pressure regulator communicating with said conduit upstream of said main valve; a movable wall actuator for said main valve communicating with the output of said pressure regulator; a pilot valve communicating with said movable wall actuator and the output of said pressure regulator; an orifice between said pressure regulator and said actuator for conducting fluid pressure to said actuator and said pilot valve; means for conducting a signal to said pilot valve whereby said pilot valve is operable in response thereto and varies pressure communicating with said actuator downstream of said orifice; a check valve having an outlet communicating with said movable wall actuator; said actuator having a movable wall element having opposed surfaces, one of which communicates with the output of said pressure regulator and the other of which communicates with the outlet of said check valve; and a passage means intercommunicating with said check valve and said conduit at a location therein downstream from said main valve, said check valve having means provided with opposed surfaces, one of which communicates with output pressure from said pressure regulator, and the other of which communicates with pressure in said passage means, whereby, when pressure downstream of said main valve is greater than said regulator pressure output, said check valve opens and permits communication between downstream pressure in said passage means and the outlet of said check valve, whereupon such downstream pressure is conducted to said other surface of said actuator, causing a pressure differential on said movable wall element, which tends to move said main valve toward a closed position.

18. In a gas turbine engine, the combination of: a compressor; a turbine in driving relation with said compressor; surge prevention means for said compressor having a passage communicating with the outlet of said compressor and leading to a region of reduced pressure; surge valve means in said passage; a first means connected with said surge valve means for actuating the same; control means for said first actuating means, said control means having a pilot valve with relatively movable parts; a second means responsive to fluid pressure signals to actuate one part of said pilot valve, another part of said pilot valve being connected with and actuated by said first actuating means simultaneously with the actuation of said surge valve means; means for sensing variations in the quantity of fluid flowing through said compressor, said means having a third fluid pressure responsive means exposed to the difference between total and static pressures at the compressor inlet and to a pressure differential related to compressor outlet pressure; and means actuated by said third fluid pressure responsive means for imparting control signals to said second means.

19. In a gas turbine engine, the combination of: a compressor; a turbine in driving relation with said compressor; surge prevention means for said compressor having a passage communicating with the outlet of said compressor and leading to a region of reduced pressure; valve means in said passage; a first means connected with said valve means for actuating the same; control means for said first actuating means, said control means having a pilot valve with relatively movable parts; a second means responsive to fluid pressure signals to actuate one part of said pilot valve, another part of said valve being connected with and actuated by said first actuating means; sensing means responsive to variations in the quantity of fluid flowing through said compressor to impart control signals to said second means; and means connected with said first actuating means and operative during the starting phase of said gas turbine engine to retain said valve means in a predetermined position until normal operation of the engine is attained.

20. In a gas turbine engine, the combination of: a compressor; a turbine in driving relation with said compressor; a combustor disposed to receive air from said compressor and deliver gases of combustion to the inlet of said turbine; variable area nozzle means in the inlet of said turbine; actuating means for said variable area nozzle means; surge prevention means for said compressor having a passage communicating with the outlet of said compressor and leading to a region of reduced pressure; valve means in said passage; actuating means operatively disposed relative to said valve means; sensing means responsive to variations in the quantity of fluid flowing through said compressor to create control signals; and control means for said nozzle actuating means and said valve actuating means, said control means being in communication with said sensing means and responsive to signals therefrom to effect the operation of said nozzle and valve actuating means, said control means being adjusted to increase the effective area of said nozzle means prior to the opening of said valve means.

21. In a gas turbine engine, the combination of: a compressor; a turbine in driving relation with said compressor; a combustor disposed to receive air from said compressor and deliver gases of combustion to the inlet of said turbine; variable area nozzle means in the inlet of said turbine; hydraulic pressure responsive means for actuating said variable area nozzle means; a first control means operatively disposed relative to said hydraulic pressure responsive means, said control means having a pilot valve and means responsive to fluid pressure signals to actuate said pilot valve; surge prevention means for said compressor having a passage communicating with the outlet of said compressor and leading to a region of reduced pressure; valve means in said passage; actuating means responsive in part to fluid pressure operatively disposed relative to said valve means; a second control means for said valve actuating means, said second control means having a feed-back-type pilot valve with relatively movable parts; means responsive to fluid pressure signals to actuate one part of said pilot valve, another part of said valve being connected with and actuated by said valve actuating means; and sensing means responsive to variations in the quantity of fluid flowing through said compressor to impart control signals of varying magnitude to said first and second control means to effect the actuation of said variable area nozzle and said surge prevention valve, said nozzle being actuated by signals of lesser magnitude and said surge prevention valve being actuated by signals of greater magnitude.

22. In a gas turbine engine, the combination of: a compressor; a turbine in driving relation with said compressor; adjustable nozzle means for controlling fluid flow to said turbine; means for adjusting said nozzle means; surge prevention means for said compressor having a passage leading from the outlet of said compressor to a region of reduced pressure; valve means in said passage; means operatively related to said valve means for actuating the same; and sensing means responsive to variations in mass flow through said compressor to transmit control signals of different magnitude to said nozzle and said valve actuating means to initiate operations threof, said nozzle actuating means being responsive to control signals of lesser magnitude than said valve actuating means.

23. In a gas turbine engine, the combination of: a compressor; a turbine in driving relation with said compressor; surge prevention means for said compressor having a passage leading from the outlet of said compressor to a region of reduced pressure; valve means in said passage; a first means operatively related to said valve means for actuating the same; a second means operative upon and during initiation of turbine operation to cause said first means to maintain said valve means in a closed position, said second means being rendered inoperative when said compressor starts to deliver fluid at normal output pressure; and sensing means responsive to variations in mass flow through said compressor to transmit control signals to said valve actuating means to initiate operations thereof.

24. In a gas turbine engine, the combination of: a compressor; a turbine in driving relation with said compressor; adjustable nozzle means for controlling fluid flow to said turbine; means for adjusting said nozzle means; surge prevention means for said compressor having a passage leading from the outlet of said compressor to a region of reduced pressure; valve means in said passage; a first means operatively related to said valve means for actuating the same; a second means operative upon and during initiation of turbine operation to cause said first means to maintain said valve means in a closed position, said second means being rendered inoperative when said compressor starts to deliver fluid at normal output pressure; and sensing means responsive to variations in mass flow through said compressor to transmit control signals of different magnitude to said nozzle and said valve actuating means to initiate operations thereof, said nozzle actuating means being responsive to control signals of lesser magnitude than said valve actuating means

References Cited in the file of this patent

UNITED STATES PATENTS

| | | |
|---|---|---|
| 1,241,372 | Guyer | Sept. 25, 1917 |
| 1,987,505 | Edler | Jan. 8, 1935 |
| 2,056,198 | Lasley | Oct. 6, 1936 |
| 2,409,533 | Borden | Oct. 15, 1946 |
| 2,456,211 | Nardone | Dec. 14, 1948 |
| 2,514,248 | Lombard et al. | July 4, 1950 |
| 2,618,431 | Walker | Nov. 18, 1952 |
| 2,625,789 | Starkey | Jan. 20, 1953 |
| 2,651,492 | Feilden | Sept. 8, 1953 |
| 2,808,702 | Dotson | Oct. 8, 1957 |
| 2,863,601 | Torell | Dec. 9, 1958 |

FOREIGN PATENTS

| | | |
|---|---|---|
| 696,191 | Great Britain | Aug. 26, 1953 |